US005927437A

United States Patent [19]

Fast

[11] Patent Number: 5,927,437

[45] Date of Patent: Jul. 27, 1999

[54] UNIVERSAL HUNTING STAND

[76] Inventor: Curtis D. Fast, 1104 5th Ave., Mountain Lake, Minn. 56159

[21] Appl. No.: 09/074,151

[22] Filed: May 7, 1998

[51] Int. Cl.$^{6}$ .................................................... E04G 3/00

[52] U.S. Cl. ........................................................ 182/187

[58] Field of Search ............................ 182/20, 116, 150, 182/187, 188; 108/152

[56] References Cited

U.S. PATENT DOCUMENTS

| | | | |
|---|---|---|---|
| 3,067,975 | 12/1962 | Wilcox | 182/187 X |
| 3,261,425 | 7/1966 | Harder | 182/187 |
| 3,749,200 | 7/1973 | Meyer | 182/187 |
| 4,150,733 | 4/1979 | Plummer | 182/187 |
| 4,236,602 | 12/1980 | Leggett | 182/187 |
| 4,705,143 | 11/1987 | Ziemba | 182/187 |
| 4,730,700 | 3/1988 | Miller et al. | 182/187 |
| 5,427,344 | 6/1995 | Beauchemin | 182/187 |
| 5,450,927 | 9/1995 | Harton et al. | 182/187 |
| 5,492,196 | 2/1996 | Michno | 182/187 |

*Primary Examiner*—Daniel P. Stodola
*Assistant Examiner*—Richard M. Smith

[57] ABSTRACT

A hunting stand including a platform and a plurality of leg assemblies each mounted to corners of the platform and adapted to pivot about a horizontal axis and a vertical axis which intersect adjacent the corresponding corner of the platform. The leg assemblies are adapted to be secured to a recipient surface for maintaining the platform in a fixed horizontal orientation.

8 Claims, 3 Drawing Sheets

UNIVERSAL HUNTING STAND

BACKGROUND OF THE INVENTION

1. Field of the Invention

The present invention relates to deer stands and more particularly pertains to a new universal hunting stand for being mounted in any elevated entity, such as a tree, and further adapted to be adjusted to accommodate various structures, such as branches, therein.

2. Description of the Prior Art

The use of deer stands is known in the prior art. More specifically, deer stands heretofore devised and utilized are known to consist basically of familiar, expected and obvious structural configurations, notwithstanding the myriad of designs encompassed by the crowded prior art which have been developed for the fulfillment of countless objectives and requirements.

Known prior art deer stands include U.S. Pat. No. 5,090,506; U.S. Pat. No. 5,101,934; U.S. Pat. Des. No. 306,348; U.S. Pat. No. 4,995,475; U.S. Pat. No. 4,579,198; and U.S. Pat. No. 4,997,063.

In these respects, the universal hunting stand according to the present invention substantially departs from the conventional concepts and designs of the prior art, and in so doing provides an apparatus primarily developed for the purpose of being mounted in any elevated entity such as a tree and further adapted to be adjusted to accommodate various structures therein.

SUMMARY OF THE INVENTION

In view of the foregoing disadvantages inherent in the known types of deer stands now present in the prior art, the present invention provides a new universal hunting stand construction wherein the same can be utilized for being mounted in any elevated entity such as a tree and further adapted to be adjusted to accommodate various structures therein.

The general purpose of the present invention, which will be described subsequently in greater detail, is to provide a new universal hunting stand apparatus and method which has many of the advantages of the deer stands mentioned heretofore and many novel features that result in a new universal hunting stand which is not anticipated, rendered obvious, suggested, or even implied by any of the prior art deer stands, either alone or in any combination thereof.

To attain this, the present invention generally comprises a platform having a pair of side bars each with a square cross-section and a pair of ends. A single end bar with a square cross-section has a pair of ends fixedly coupled between a pair of ends of the side bars. Thus, the side bars are maintained in a spaced parallel configuration. A plurality of cylindrical rods are mounted between the side bars in perpendicular and coplanar relationship therewith to define a supporting surface. FIGS. 1 & 2 depict a plurality of leg assemblies each mounted to an associated corner of a lower surface of the platform. Each leg assembly includes a pivot having a square horizontal top face pivotally coupled to the platform. A square vertical end face is integrally coupled to an end of the top face and extends downwardly therefrom. A pair of side faces have a quarter-circular configuration and are coupled between the top and end face. Each side face has a pair of coaxially aligned pivot apertures formed adjacent an interconnection of the top and end face. Further, a plurality of coaxially aligned pairs of securement apertures are formed along a free edge of the side faces. Each leg assembly further includes a leg with a square cross-section and a plurality of linearly aligned equally spaced apertures formed therein along a length of each of the faces of the leg. An end of the leg is pivotally coupled between the pivot apertures of the pivot for allowing the leg to pivot universally. Further included as a component of each leg assembly is a pin adapted to be extended through a pair of the apertures of the leg and the securement apertures. This precludes the leg from pivoting about an axis defined by the pivot apertures. Lastly, a bolt is provided for extending through a pair of the apertures of the leg and engaging a tree for maintaining the platform fixedly secured therein. Also included is an inverted T-shaped seat mount having a horizontal extent with a pair of square apertures formed therein. Such apertures are adapted for releasably receiving ends of the side bars opposite the end bar. As such, a vertical extent of the seat mount extends upwardly from the platform. Finally, a seat assembly includes a disk with a mounting arm connected to a bottom surface thereof and extending radially therefrom to terminate at an end. Such end is pivotally coupled to a top of the vertical extent of the seat mount such that the mounting arm and disk are adapted to pivot within a vertical plane between a raised and lowered orientation.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new universal hunting stand apparatus and method which has many of the advantages of the deer stands mentioned heretofore and many novel features that result in a new universal hunting stand which is not anticipated, rendered obvious, suggested, or even implied by any of the prior art deer stands, either alone or in any combination thereof.

It is another object of the present invention to provide a new universal hunting stand which may be easily and efficiently manufactured and marketed.

It is a further object of the present invention to provide a new universal hunting stand which is of a durable and reliable construction.

An even further object of the present invention is to provide a new universal hunting stand which is susceptible of a low cost of manufacture with regard to both materials and labor, and which accordingly is then susceptible of low prices of sale to the consuming public, thereby making such universal hunting stand economically available to the buying public.

Still yet another object of the present invention is to provide a new universal hunting stand which provides in the apparatuses and methods of the prior art some of the advantages thereof, while simultaneously overcoming some of the disadvantages normally associated therewith.

Still another object of the present invention is to provide a new universal hunting stand for being mounted in any elevated entity such as a tree and further adapted to be adjusted to accommodate various structures therein.

Even still another object of the present invention is to provide a new universal hunting stand that includes a platform and a plurality of leg assemblies each mounted to corners of the platform and adapted to pivot about a horizontal axis and a vertical axis which intersect adjacent the corresponding corner of the platform. The leg assemblies are adapted to be secured to a recipient surface for maintaining the platform in a fixed horizontal orientation.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
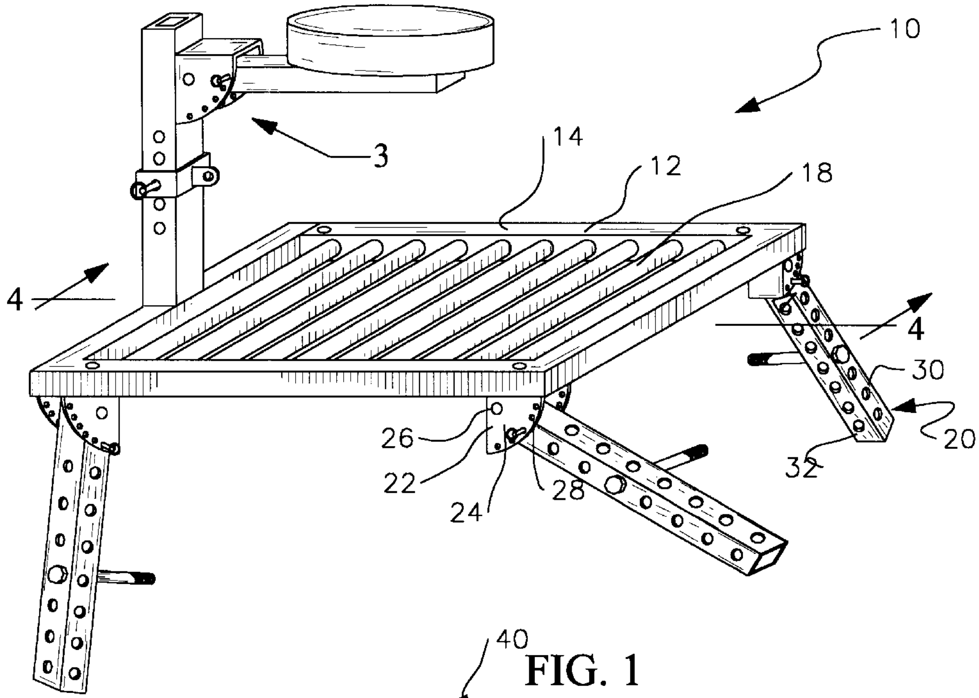
FIG. 1 is a perspective view of a new universal hunting stand according to the present invention.

With reference now to the drawings, and in particular to FIGS. 1 through 4 thereof, a new universal hunting stand embodying the principles and concepts of the present invention and generally designated by the reference numeral 10 will be described.

The present invention includes a platform 12 having a pair of side bars 14 each with a square cross-section and a pair of ends. A single end bar 16 with a square cross-section has a pair of ends fixedly coupled between a pair of ends of the side bars. Thus, the side bars are maintained in a spaced parallel configuration. A plurality of cylindrical rods 18 are fixedly mounted between the side bars in perpendicular and coplanar relationship therewith to define a supporting surface.

Figure 2:
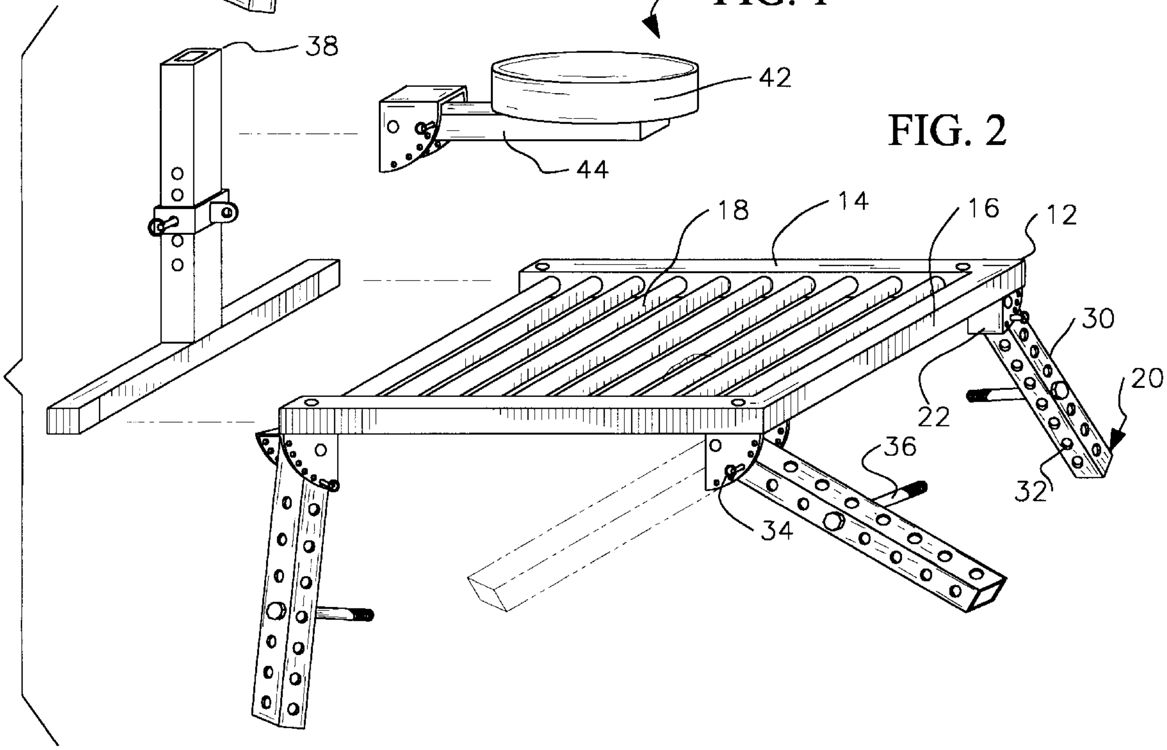
FIG. 2 is an exploded perspective view of the seat of the present invention.
Figure 3:
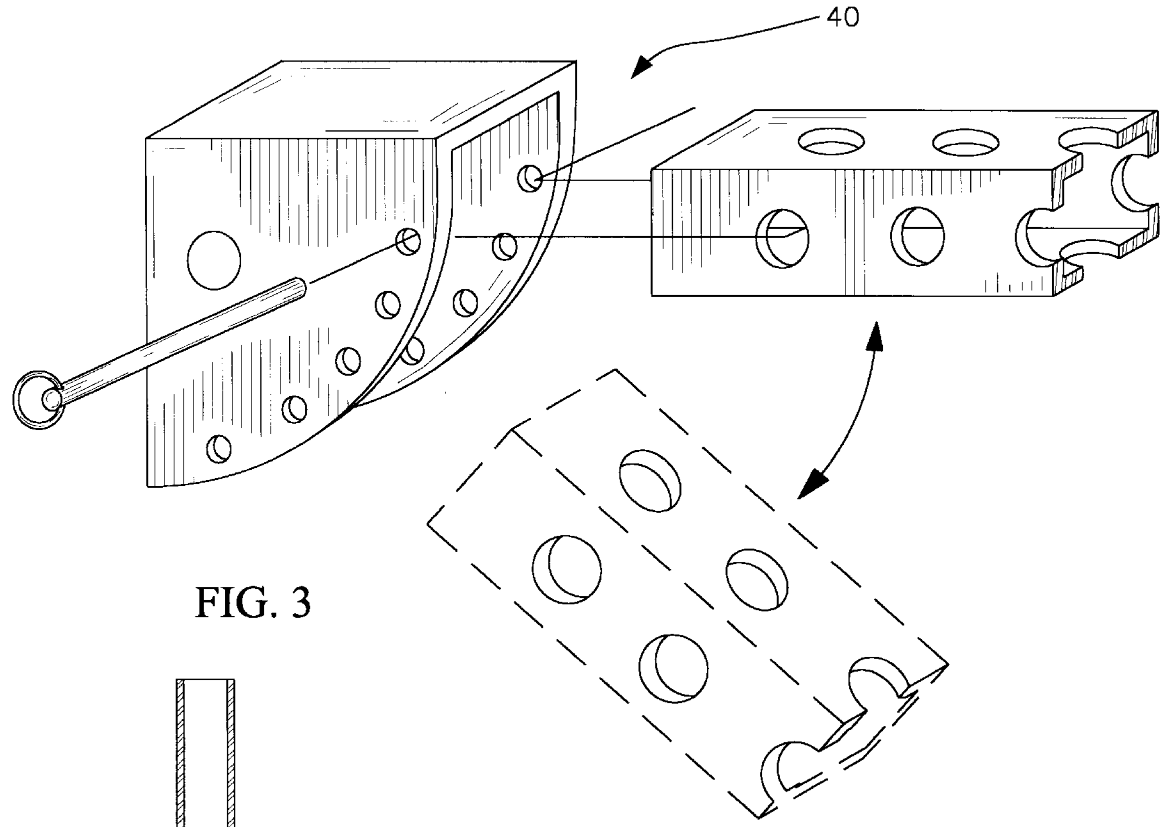
FIG. 3 is a close-up exploded view of a portion of the seat of the present invention.
Figure 4:
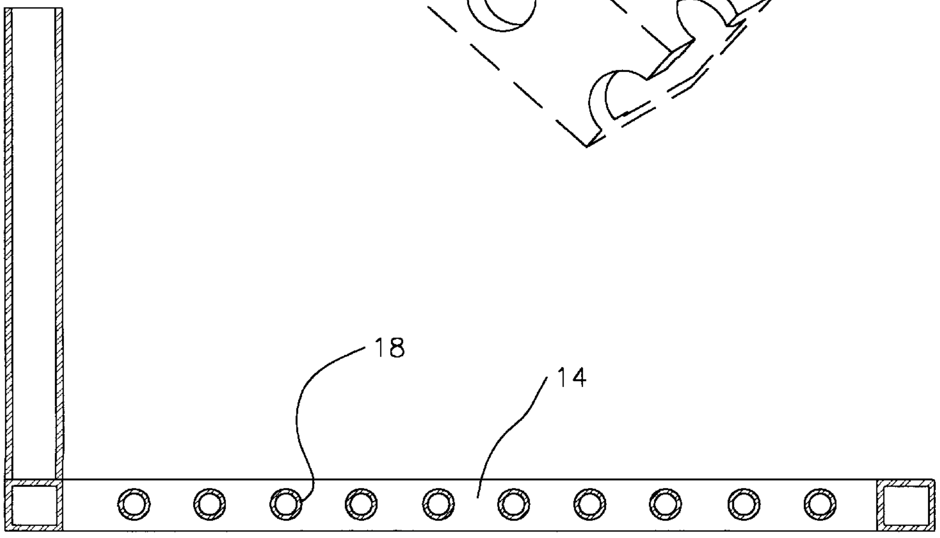
FIG. 4 is a cross-sectional view of the present invention taken along line 4—4 shown in FIG. 1.

FIGS. 1 & 2 depict a plurality of leg assemblies 20 each mounted to an associated corner of a lower surface of the platform. Each leg assembly includes a pivot 22 having a square horizontal top face pivotally coupled to the platform. A square vertical end face is integrally coupled to an end of the top face and extends downwardly therefrom. A pair of side faces 24 have a quarter-circular configuration and are coupled between the top and end face. Each side face has a pair of coaxially aligned pivot apertures 26 formed adjacent an interconnection of the top and end face. Further, a plurality of coaxially aligned pairs of securement apertures 28 are formed along a free edge of each of the side faces.

Each leg assembly further includes a leg 30 with a square cross-section and a plurality of linearly aligned equally spaced apertures 32 formed therein along a length of each of the faces of the leg. An end of the leg is pivotally coupled between the pivot apertures of the pivot for allowing the leg to pivot universally. Further included as a component of each leg assembly is a pin 34 adapted to be extended through a pair of the apertures of the leg and the securement apertures. This precludes the leg from pivoting about an axis defined by the pivot apertures. Lastly, a bolt 36 is provided for extending through a pair of the apertures of the leg and engaging a tree for maintaining the platform fixedly secured therein.

Also included is an inverted T-shaped seat mount 38 having a horizontal extent with a pair of square apertures formed therein. Such apertures are adapted for releasably receiving ends of the side bars opposite the end bar. As such, a vertical extent of the seat mount extends upwardly from the platform.

A seat assembly 40 includes a disk 42 with a mounting arm 44 connected to a bottom surface thereof and extending radially therefrom to terminate at an end. Such end is pivotally coupled to a top of the vertical extent of the seat mount such that the mounting arm and disk are adapted to pivot within a vertical plane between a raised orientation extending above the platform and lowered orientation rested on the vertical extent of the seat mount.

Figure 5:
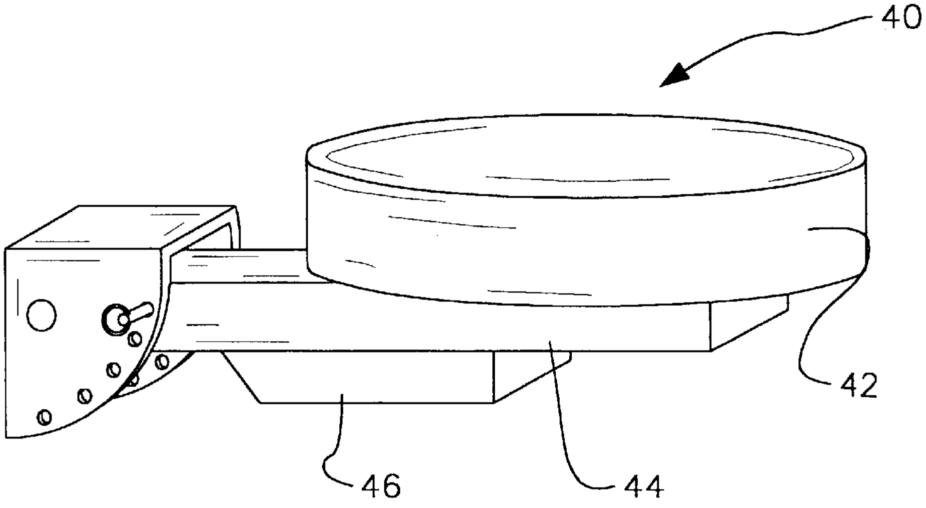
FIG. 5 is a perspective view of the seat mount with the associated adjustable cleats and hooks.

As shown in FIG. 5, a fine tune leveler block 46 may be slid between the mounting arm and a pin associated with the coupling with the vertical extent of the seat mount. Such block ensures that the disk is maintained secure in a horizontal plane. In the preferred embodiment, the vertical extent is vertically adjustable by way of a telescoping relationship between a pair of subcomponents. The elevation of the seat is ideally selectively maintained by means of a pin and apertures combination.

Figure 6:
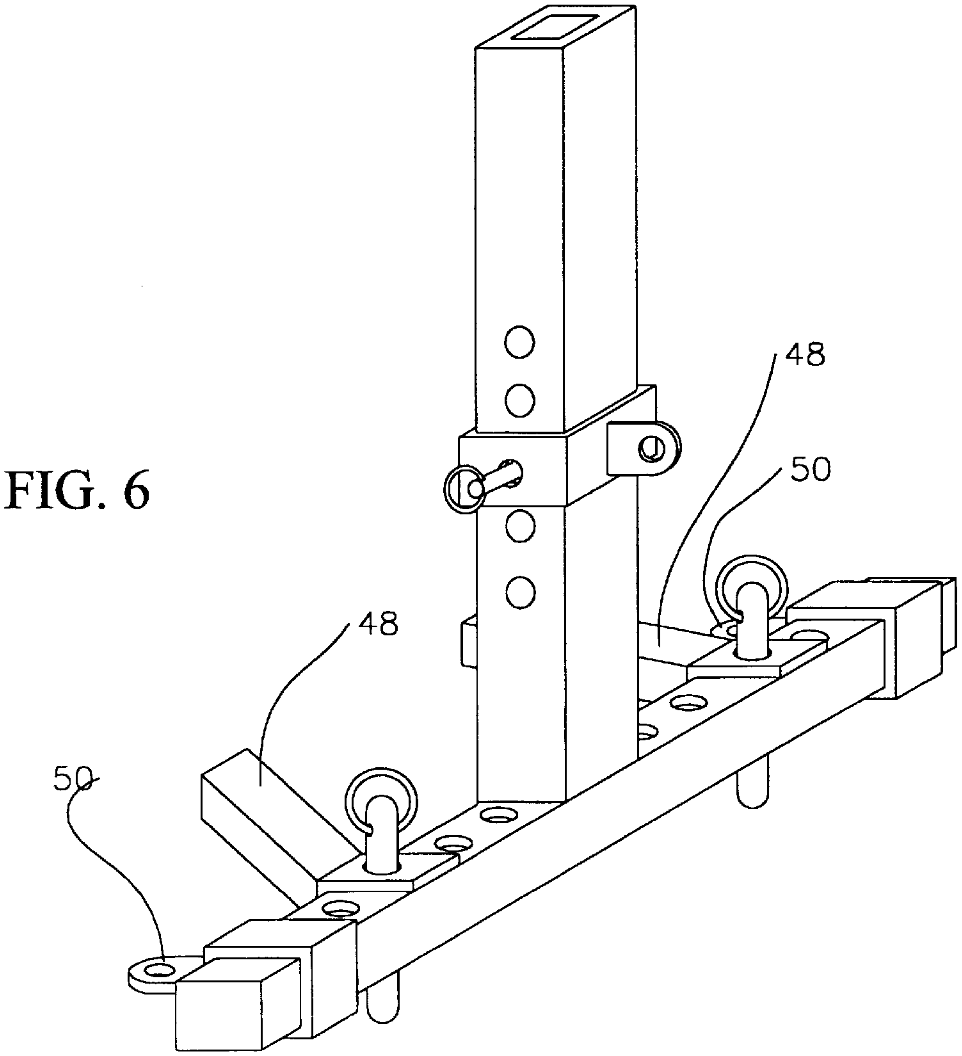
FIG. 6 is a perspective view of the seat and the fine tune lever block of the present invention.

As shown in FIG. 6, the present invention includes a pair of adjustable cleats 48 each removably attached along a selected portion of the horizontal extent of the seat mount. Such is preferably accomplished by way of a pin and aperture combination. Further provided is a plurality of hooks 50 each with a sleeve for sliding along the horizontal and vertical extent of the seat mount. Similar to the adjustable cleats, the hooks are each maintained in a fixed position via a pin and aperture combination. It should be noted that such apertures are formed along a length of the vertical and horizontal extents. Together, the cleats and hooks afford a more robust coupling with a tree or recipient surface.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A tree-mounted deer stand comprising, in combination:

a platform including a pair of side bars each with a square cross-section and a pair of ends, a single end bar with a square cross-section and a pair of ends fixedly coupled between a pair of ends of the side bars thereby maintaining the side bars in a spaced parallel configuration, and a plurality of cylindrical rods mounted between the side bars in perpendicular and coplanar relationship therewith to define a supporting surface;

a plurality of leg assemblies each mounted to an associated corner of a lower surface of the platform, each leg assembly including a pivot having a square horizontal top face pivotally coupled to the platform, a square vertical end face integrally coupled to an end of the top face and extending downwardly therefrom, and a pair of side faces having a quarter-circular configuration and coupled between the top and end face, each side face having a pivot aperture, said pivot apertures coaxially aligned and formed adjacent an interconnection of the top and end face and a plurality of coaxially aligned pairs of securement apertures formed along a free edge of the side faces, each leg assembly further including a leg with a square cross-section and a plurality of linearly aligned equally spaced apertures formed therein along a length of each of the faces of the leg, wherein an end of the leg is pivotally coupled between the pivot apertures of the pivot for allowing the leg to pivot universally, each leg assembly further including a pin adapted to be extended through a pair of the apertures of the leg and the securement apertures for precluding the leg from pivoting about an axis defined by the pivot apertures and a bolt for extending through a pair of the apertures of the leg and engaging a tree for maintaining the platform fixedly secured therein;

an inverted T-shaped seat mount including a horizontal extent with a pair of square apertures formed therein for releasably receiving ends of the side bars opposite the end bar such that a vertical extent of the seat mount extends upwardly from the platform; and a seat assembly including a disk with a mounting arm connected to a bottom surface thereof and extending radially therefrom to terminate at an end, the end of the mounting arm pivotally coupled to a top of the vertical extent of the seat mount such that the mounting arm and disk are adapted to pivot within a vertical plane between a raised and lowered orientation.

2. A deer stand comprising:

a platform;

a plurality of leg assemblies each mounted to corners of the platform and adapted to pivot about a horizontal axis and a vertical axis which intersect adjacent the corresponding corner of the platform, wherein the leg assemblies are adapted to be secured to a recipient surface for maintaining the platform in a fixed horizontal orientation;

each leg assembly including a pivot having a top face engaging said platform, an end face perpendicularly depending from an edge said top face, and a pair of side faces engaging said top face, each side face having a pivot aperture, said pivot apertures coaxially aligned and formed adjacent an interconnection of the top and end face and a plurality of coaxially aligned pairs of securement apertures formed along a free edge of the side faces;

each leg assembly further including a leg with a plurality of apertures formed therein;

each leg assembly further including a pin adapted to be extended through a pair of the apertures of the leg and the securement apertures for precluding the leg from pivoting about an axis defined by the pivot apertures; and an inverted T-shaped seat mount including a horizontal extent with a pair of apertures formed therein for releasably receiving ends of the side bars opposite the end bar such that a vertical extent of the seat mount extends upwardly from the platform.

3. A deer stand as set forth in claim 2 wherein the leg assemblies are adapted to be fixed with respect to the horizontal axis.

4. A deer stand as set forth in claim 2 wherein the leg assemblies each have a plurality of linearly aligned apertures formed therein.

5. A deer stand as set forth in claim 2 and further including a seat mounted to the platform.

6. A deer stand as set forth in claim 5 wherein the seat is removably mounted to the platform.

7. A deer stand as set forth in claim 5 wherein the seat is adapted to pivot within a vertical plane between a raised and lowered orientation.

8. A deer stand comprising:

a platform;

a plurality of leg assemblies each mounted to the platform;

each leg assembly including a pivot having a top face engaging said platform, an end perpendicularly depending from an edge of said top face, and a pair of side faces engaging said top face, each side face having a pivot aperture, said pivot apertures coaxially aligned and formed adjacent an interconnection of the top and end face and a plurality of coaxially aligned pairs of securement apertures formed along a free edge of the side faces;

each leg assembly further including a leg with a plurality of apertures formed therein;

each leg assembly further including a pin adapted to be extended through a pair of the apertures of the leg and the securement apertures for precluding the leg from pivoting about an axis defined by the pivot apertures; and an inverted T-shaped seat mount including a horizontal extent with a pair of apertures formed therein for releasably receiving ends of the side bars opposite the end bar such that a vertical extent of the seat mount extends upwardly from the platform.

* * * * *